United States Patent
Tamura et al.

(10) Patent No.: US 8,815,447 B2
(45) Date of Patent: Aug. 26, 2014

(54) PROTON-CONDUCTIVE INORGANIC MATERIAL FOR FUEL CELL AND FUEL CELL ANODE EMPLOYING THE SAME

(75) Inventors: Jun Tamura, Yokohama (JP); Yoshihiko Nakano, Yokohama (JP); Yasuhiro Goto, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 704 days.

(21) Appl. No.: 12/302,949

(22) PCT Filed: Oct. 3, 2008

(86) PCT No.: PCT/JP2008/068410
§ 371 (c)(1),
(2), (4) Date: Dec. 16, 2008

(87) PCT Pub. No.: WO2009/096069
PCT Pub. Date: Aug. 6, 2009

(65) Prior Publication Data
US 2010/0003566 A1    Jan. 7, 2010

(30) Foreign Application Priority Data
Jan. 28, 2008 (JP) ................... 2008-016091

(51) Int. Cl.
*H01M 4/58* (2010.01)
*H01M 4/88* (2006.01)

(52) U.S. Cl.
USPC .................. 429/231.5; 429/218.1; 252/182.1

(58) Field of Classification Search
None
See application file for complete search history.

(56) References Cited

U.S. PATENT DOCUMENTS

| | | | |
|---|---|---|---|
| 7,718,304 B2 | 5/2010 | Kang | |
| 7,887,940 B2 | 2/2011 | Tamura et al. | |
| 8,349,521 B2 | 1/2013 | Tamura et al. | |
| 2004/0072061 A1 | 4/2004 | Nakano et al. | |
| 2006/0019148 A1* | 1/2006 | Tamura et al. | ............. 429/44 |
| 2007/0074255 A1 | 3/2007 | Morioka | |
| 2007/0082257 A1 | 4/2007 | Tamura et al. | |

(Continued)

FOREIGN PATENT DOCUMENTS

| | | |
|---|---|---|
| CN | 1554130 A | 12/2004 |
| CN | 1741311 A | 3/2006 |

(Continued)

OTHER PUBLICATIONS

Machine translation of JP 2001-102071, retrieved from <http://www19.ipdl.inpit.go.jp/PA1/cgi-bin/PA1DETAIL> on Oct. 21, 2011.*

(Continued)

*Primary Examiner* — Cynthia K. Walls
(74) *Attorney, Agent, or Firm* — Oblon, Spivak, McClelland, Maier & Neustadt, L.L.P.

(57) ABSTRACT

The present invention aims to provide a fuel cell anode, a membrane electrode assembly and a fuel cell, so as to obtain high electric power. The fuel cell anode has an electrode catalyst layer, and the electrode catalyst layer comprises a supported catalyst comprises electrically conductive carriers and fine catalytic particles supported thereon, a proton-conductive inorganic oxide supporting $SiO_2$ on its surface, and a proton-conductive organic polymer binder. The $SiO_2$ supported on the inorganic oxide prevents the oxide particles from growing, to ensure the high electric power. It is necessary to control the mixing ratios among the supported catalyst, the proton-conductive oxide and the proton-conductive binder in particular ranges.

9 Claims, 1 Drawing Sheet

(56) References Cited

U.S. PATENT DOCUMENTS

| | | |
|---|---|---|
| 2007/0134533 A1 | 6/2007 | Tamura et al. |
| 2007/0166600 A1 | 7/2007 | Kang |
| 2007/0207360 A1 | 9/2007 | Tamura et al. |
| 2008/0026282 A1 | 1/2008 | Tamura et al. |
| 2008/0254974 A1 | 10/2008 | Nakano et al. |

FOREIGN PATENT DOCUMENTS

| | | | |
|---|---|---|---|
| CN | 1941466 A | 4/2007 | |
| CN | 1983696 A | 6/2007 | |
| CN | 101000961 A | 7/2007 | |
| JP | 2001-102071 * | 4/2001 | ............ H01M 8/02 |
| JP | 2004 158261 | 6/2004 | |
| WO | WO 2006/137579 A1 | 12/2006 | |

OTHER PUBLICATIONS

U.S. Appl. No. 12/372,135, filed Feb. 17, 2009, Tamura, et al.

U.S. Appl. No. 12/201,332, filed Aug. 29, 2008, Tamura, et al.

Combined Office Action and Search Report issued Nov. 2, 2012 in Chinese Application No. 200880125672.8 (With English Translation).

Office Action issued Feb. 5, 2013 in Japanese Patent Application No. 2008-016091 with English language translation.

Office Action issued Jun. 24, 2013, in Chinese Patent Application No. 200880125672.8 with English language translation.

Office Action issued on Dec. 30, 2013 in the corresponding Chinese Patent Application No. 200880125672.8 (with English Translation).

* cited by examiner

US 8,815,447 B2

PROTON-CONDUCTIVE INORGANIC MATERIAL FOR FUEL CELL AND FUEL CELL ANODE EMPLOYING THE SAME

CROSS-REFERENCE TO RELATED APPLICATIONS

This application is based upon and claims the benefit of priority from the prior Japanese Patent Applications No. 16091/2008, filed on Jan. 28, 2008; the entire contents of which are incorporated herein by reference.

BACKGROUND OF THE INVENTION

1. Field of the Invention

The present invention relates to a fuel cell anode, a membrane electrode assembly comprising the same, and a fuel cell using them. Further, the present invention also relates to a process for production of said fuel cell anode or membrane electrode.

2. Background Art

Polymer electrolyte fuel cells, in particular, using aqueous solutions of methanol as fuels have been vigorously studied to use as electric power supplies for mobile devices because they can work even at a low temperature and can be downsized and lightened. However, conventional fuel cells still have insufficient performance to be used widely.

A fuel cell is a device that converts chemical energy into electric energy by a catalytic reaction on the electrode. In the fuel cell, protons are generated on the anode catalyst and then transfer to the cathode through a proton-conductive polymer membrane. Therefore, for improving the performance of fuel cell, it is indispensable to develop a material having excellent proton-conductivity and to produce an electrode using that material.

Proton-conductive polymers containing perfluorosulfonic acid are well-known proton-conductive materials. For example, a tetrafluoroethylene/perfluorovinyl ether copolymer containing sulfonic acid groups as ion-exchange groups (e.g., Nafion [trademark], available from DuPont) is widely adopted as the proton-conductive material of the electrode catalyst layer. However, in view of realizing excellent proton-conductivity, there is still room for improvement in the electrode.

As a material for the electrode comprising a proton-conductive inorganic oxide and a proton-conductive organic polymer binder, a sulfuric acid-supported metal oxide (e.g., disclosed in JP-A 2004-158261 (KOKAI)) is known. The sulfuric acid-supported metal oxide is a proton-conductive inorganic oxide having solid super-strong acidity, and is prepared by the steps of: loading sulfate ion on the surface of oxide containing at least one element selected from the group consisting of zirconium, titanium, iron, tin, silicon, aluminum, molybdenum, and tungsten; and then heating to fix the sulfate ion on the surface of the oxide. Because of the fixed sulfate ion, the sulfuric acid-supported metal oxide can have proton-conductivity. However, since the sulfate ion are often released by hydrolysis, the sulfuric acid-supported metal oxide is an unstable proton-conductive material when used in a fuel cell, in particular, using a liquid fuel because the fuel cell generates water together with electric power. It is, therefore, presumed that there is much room for improvement in the sulfuric acid-supported metal oxide in consideration of ensuring stable electric power for a long time.

In JP-A 2006-32287 (KOKAI), the present inventors have already proposed a fuel cell electrode comprising oxide carriers such as oxide of Ti, oxide particles such as oxide of W, and a binder for uniting them. However, in the electrode catalyst layer comprising the oxides of Ti and W (proton-conductive inorganic oxides), PtRu catalyst and the binder, the binder is presumed to inhibit the correlations among the oxide super-strong acids or those among the PtRu catalyst carriers. Further, it is also presumed that an enough amount of water to generate protons cannot be supplied to the proton-conductive inorganic oxides or an enough amount of fuel cannot be supplied to the redox catalyst since the binder attaches onto the surfaces of the oxide super-strong acids or onto the surface of the redox catalyst, respectively. Consequently, it is presumed that a sufficient amount of three-phase interfaces, which are necessary for the electrode reaction, cannot be formed.

As described above, in order to improve the proton-conductivity of the electrode catalyst layer or to promote the electrode reaction, various proton-conductive materials have been developed. However, there is still room for improvement in the performance thereof.

When the aforementioned known proton-conductive inorganic oxides are synthesized, nanoparticles thereof are liable to aggregate and grow to lower the specific surface area and accordingly to decrease effective proton-conductive sites. As a result, the proton-conductivity is so lowered that the resultant fuel cell as a whole cannot provide sufficient power.

SUMMARY OF THE INVENTION

A fuel cell anode according to one embodiment of the present invention comprises an electrode catalyst layer comprising:
a supported catalyst comprises electrically conductive carriers and fine catalytic particles supported on said electrically conductive carriers,
a proton-conductive inorganic oxide supporting $SiO_2$ on its surface, and
a proton-conductive organic polymer binder;
wherein
the weight ratio ($W_{SA+SiO2}/W_c$) of the $SiO_2$-containing proton-conductive inorganic oxide ($SA+SiO_2$) and the supported catalyst (C) is in the range of 0.037 to 0.25, the weight ratio ($W_P/W_{SA+SiO2}$) of the proton-conductive organic polymer binder (P) and the $SiO_2$-containing proton-conductive inorganic oxide ($SA+SiO_2$) is in the range of 3.5 to 12, and
the weight ratio ($W_{SiO2}/W_{SA}$) of the $SiO_2$ and the proton-conductive inorganic oxide (SA) is in the range of 0.1 to 0.5.

A membrane electrode assembly according to one embodiment of the present invention comprises an anode, a cathode, and an electrolyte membrane placed between said anode and said cathode;
wherein
said anode has a catalyst layer which comprises an electrode catalyst layer comprising
a supported catalyst comprises electrically conductive carriers and fine catalytic particles supported on said electrically conductive carriers,
a proton-conductive inorganic oxide supporting $SiO_2$ on its surface, and
a proton-conductive organic polymer binder,
provided that
the weight ratio ($W_{SA+SiO2}/W_c$) of the $SiO_2$-containing proton-conductive inorganic oxide ($SA+SiO_2$) and the supported catalyst (C) is in the range of 0.037 to 0.25, the weight ratio ($W_P/W_{SA+SiO2}$) of the proton-conductive organic polymer binder (P) and the $SiO_2$-containing proton-conductive inorganic oxide ($SA+SiO_2$) is in the range of 3.5 to 12, and the weight ratio ($W_{SiO2}/W_{SA}$) of the $SiO_2$ and the proton-conductive inorganic oxide (SA) is in the range of 0.1 to 0.5.

A fuel cell according to one embodiment of the present invention comprises an anode, a cathode, and an electrolyte membrane placed between said anode and said cathode; wherein said anode has a catalyst layer which comprises an electrode catalyst layer comprising a supported catalyst comprises electrically conductive carriers and fine catalytic particles supported on said electrically conductive carriers, a proton-conductive inorganic oxide supporting $SiO_2$ on its surface, and a proton-conductive organic polymer binder, provided that the weight ratio ($W_{SA+SiO2}/W_c$) of the $SiO_2$-containing proton-conductive inorganic oxide ($SA+SiO_2$) and the supported catalyst (C) is in the range of 0.037 to 0.25, the weight ratio ($W_P/W_{SA+SiO2}$) of the proton-conductive organic polymer binder (P) and the $SiO_2$-containing proton-conductive inorganic oxide ($SA+SiO_2$) is in the range of 3.5 to 12, and the weight ratio ($W_{SiO2}/W_{SA}$) of the $SiO_2$ and the proton-conductive inorganic oxide (SA) is in the range of 0.1 to 0.5.

A process according to one embodiment of the present invention for preparation of a proton-conductive inorganic oxide, comprises the steps of:

dispersing $SiO_2$ particles and oxide carriers containing at least one element Y selected from the group consisting of Ti, Zr and Sn, in a solution containing at least one element X selected from the group consisting of W, Mo and V;

removing the solvent; and subjecting the residue to heat treatment.

The present invention provides an inorganic oxide having high proton-conductivity. Particles of that inorganic oxide are prevented from growing, which lowers the power of fuel cell, and accordingly the power of fuel cell can be improved by the present invention.

DETAILED DESCRIPTION OF THE INVENTION

From the viewpoint described above, the present inventors have studied about the relation between the composition of electrode and the synthesizing process of proton-conductive inorganic oxide. As a result, it is found that, if $SiO_2$ particles are used to synthesize the inorganic oxide, particle growth of the oxide can be inhibited to improve the proton-conductivity, and thus a proton-conductive inorganic oxide having high proton-conductivity can be obtained.

Embodiments of the present invention are described below.

First, a proton-conductive inorganic oxide according to one embodiment of the present invention is explained.

The proton-conductive inorganic oxide can be freely selected from oxides known to those skilled in the art. For example, it may be a proton-conductive inorganic oxide comprising oxide carriers containing at least one element Y selected from the group consisting of Ti, Zr and Sn, and thereon-supported oxide particles containing at least one element X selected from the group consisting of W, Mo and V. (Hereinafter, such oxide is often referred to as "X and Y-containing proton-conductive inorganic oxide".) Here, each of the X and Y may be a mixture of two or more elements, but even in that case, the mixture of elements selected from the group of X or Y is simply referred to as X or Y, respectively, just for the sake of convenience.

The proton-conduction mechanism in the X and Y-containing proton-conductive inorganic oxide is not yet revealed in detail, but is presumed as follows. The oxide particles containing the element X (hereinafter, often referred to as "oxide particles A"), such as $WO_3$, $MoO_3$ or $V_2O_5$, are supported on the surfaces of the oxide carriers containing the element Y (hereinafter, often referred to as "oxide carriers B"), such as $TiO_2$, $ZrO_2$ or $SnO_2$, and thereby Lewis acid points are formed in the oxide carriers B. The Lewis acid points are then hydrated to be br$\phi$sted acid points, which form a proton-conduction field. If the proton-conductive inorganic oxide has an amorphous structure, the formation of Lewis acid points is supposed to be further promoted.

Thus, the number of accompanying water molecules, which are necessary for the proton-conduction, can be reduced and, in addition, protons are generated by the reaction at the Lewis acid points. Accordingly, the proton conduction can be provided by only a small amount of water existing on the surface of the proton-conductive inorganic oxide. This means that large electric power can be generated without strictly controlling water.

The proton-conductive inorganic oxide is incorporated in at least one of the anode, the cathode and the electrolyte membrane, and thereby the cell resistance can be reduced to increase the maximum power generated by the fuel cell.

Meanwhile, the oxide particles A are often water-soluble although the solubility thereof depends upon the elements or pH condition. Even so, however, since the oxide particles A are supported on the oxide carriers B having a low solubility in water, they are prevented from dissolving in water and hence the proton-conductive inorganic oxide is stable against water and liquid fuels. At the same time, other parts of the fuel cell and peripheral devices are also protected from contamination caused by ions released from the dissolved oxide particles A. As a result, according to the present invention, the fuel cell can keep high reliability for a long time. Further, if an inexpensive base material is used as the oxide carriers B, the production coat of the fuel cell can be reduced.

The proton-conductive inorganic oxide further comprises $SiO_2$ supported on the surface. The supported $SiO_2$ may be in the form of fine particles or an accumulated layer. The $SiO_2$ supported on the surface can prevent the proton-conductive inorganic oxide particles from aggregating to grow (as described later in detail).

For confirming that the oxide particles A and $SiO_2$ are supported on the oxide carriers B, instrumental analysis such as transmission electron microscopy (TEM), X-ray diffraction (XRD) or X-ray photoelectron spectroscopy (XPS) can be used.

In the following description, a process for preparation of the proton-conductive inorganic oxide according to the present invention is then explained.

The oxide carriers B can be synthesized by the gas-phase method in which a gas containing the element Y is decomposed and converted into the oxide, or by the sol-gel method in which the oxide is obtained from a solution containing the element Y or from a metal alkoxide of the element Y. However, the synthesizing method is not particularly restricted. The oxide carriers B may be a compound oxide containing two or more metal elements. In order to obtain enough high proton-conductivity, $SnO_2$ is preferred. On the other hand, however, in order to obtain high proton-conductivity without increasing the production cost, $TiO_2$ is preferred. There is no particular restriction on the shape of the oxide carriers B, which may be in the shape of, for example, particles, fibers, tabular grains, laminate flakes or porous grains. The surfaces of the oxide carriers B serve as proton-conductive sites, and for increasing the proton-conductive sites the oxide carriers B are preferably in the form of nanoparticles.

The oxide particles A are preferably loaded on the surfaces of the oxide carriers B by the steps of: dispersing the oxide carriers B in a solution in which a substance containing the element X is dissolved, for example, dispersing the oxide carriers B in an aqueous solution of chloride, nitrate, hydroacid salt or oxo-acid salt of the element X or in an alcohol solution of the element X alkoxide; removing the solvent to load the substance of the element X on the oxide carriers B; and subjecting the substance to heat treatment so as to convert the substance into the oxide particles A. However, the process for loading the oxide particles A on the oxide carriers B is not restricted to the above. For example, the oxide particles A may be a compound oxide containing two or more metal elements. In the above process, the solvent is normally heated to remove. However, the solvent may be removed without heating under reduced pressure, or may be heated under reduced pressure.

In the present invention, the oxide particles A may be supported on only a part of the surfaces of the oxide carriers B. For example, the surfaces of the oxide carriers B may be dotted with the oxide particles A, or otherwise the oxide carriers B may be covered with a layer of the oxide particles A. There is no particular restriction on the crystallinities of the oxide particles A and the oxide carriers B, as long as the oxide particles A are supported on the surfaces of the oxide carriers B. However, both of the oxide particles A and the oxide carriers B are preferably amorphous in consideration of promoting the formation of Lewis acid points, of improving the acidity, of reducing the production cost, and of simplifying the production process. More preferably, the oxide particles A are amorphous while the oxide carriers B are crystalline. However, both of the oxide particles A and the oxide carriers B may be crystalline, or otherwise the oxide particles A and the oxide carriers B may be crystalline and amorphous, respectively.

In the loading process described above, the solvent is removed to load the material of the oxide particles A on the oxide carriers B. In the step of removing the solvent, precursor particles of the proton-conductive inorganic oxide are formed. However, the precursor particles, in which the material of the oxide particles A is supported on the oxide carriers B, are liable to aggregate firmly. It is not easy to break the aggregated particles, and hence the production cost may be increased. On the other hand, however, if the aggregated particles are successively subjected to the heat treatment, the oxide carriers B are sintered to grow.

Particularly in the case where the oxide carriers B in the form of nanoparticles are used in the present invention, the particles are liable to grow even at a temperature much lower than the melting point of the oxide carriers B. If the particles grow in such manner, the specific surface area of the particles is lowered to decrease the proton-conductive sites. Consequently, the cell resistance increases and hence the resultant fuel cell as a whole cannot provide high electric power.

The present inventors have noticed the above problem, and found that the precursor particles of the proton-conductive inorganic oxide can be easily prevented from aggregation if $SiO_2$ particles are added when the oxide carriers B are dispersed in the solution in which a substance containing the element X is dissolved. After the $SiO_2$ particles are added, the solvent is removed to obtain the oxide carriers B on which the $SiO_2$ particles are supported. The $SiO_2$ particles may be directly attached on the surfaces of the oxide carriers B, or they may be dissolved in the solution and then deposited on the oxide carriers B. It was confirmed that the added $SiO_2$ can prevent the oxide carriers B from sintering to grow in the heat treatment. The mechanism of this effect is not yet revealed, but it is presumed that $SiO_2$ existing among the aggregated particles of the oxide carriers B prevents the particles from sintering because $SiO_2$ is hardly sintered. However, it should be noted that the proton-conductive inorganic oxide synthesized in the above manner comprises not only the oxide particles A supported on the oxide carriers B but also the oxide particles A supported on the $SiO_2$ particles. It is difficult to isolate and remove the oxide particles A supported on the $SiO_2$ particles. Since $SiO_2$ is hardly sintered and the oxide particles A are not well-fixed thereon, the oxide particles A supported on the $SiO_2$ may be released and components of the released oxide particles A may contaminate parts of the fuel cell while the cell is working. Accordingly, to avoid the contamination, all the oxide particles A supported on the $SiO_2$ particles are preferably washed away with cool or hot water. In other words, the unrefined proton-conductive inorganic oxide, which is a mixture of the oxide particles A supported on the oxide carriers B and the oxide particles A supported on the $SiO_2$ particles, is washed with water to be a mixture of the oxide particles A supported on the oxide carriers B and the $SiO_2$ particles.

In order that the $SiO_2$ particles can prevent the particle growth, it is necessary to control the weight ratio ($W_{SiO2}/W_{SA}$) of the $SiO_2$ particles and the proton-conductive inorganic oxide (SA) in the range of 0.1 to 0.5. If the ratio is less than 0.1, the particle growth is insufficiently prevented. On the other hand, if it is more than 0.5, the proton- and electric conductivities of the electrode catalyst layer are reduced to lower the output power.

The size of the $SiO_2$ particles is preferably not larger than that of the oxide carriers B. In consideration of treatability and prevention of the particle growth, it is preferably in the range of to 15 nm. Further, in view of availability, it is more preferably in the range of 3 to 10 nm. There is no particular restriction on the shape and crystallinity of the $SiO_2$ particles, and hence favorable $SiO_2$ particles can be selected from the viewpoint of, for example, the production cost.

The proton-conductive inorganic oxide preferably has a specific surface area as large as possible since the surface of the oxide serves as a proton-conductive site. However, if the specific surface area is larger than 2000 $m^2/g$, it is difficult to treat and to synthesize homogeneously the inorganic oxide. On the other hand, if it is smaller than 10 $m^2/g$, the inorganic oxide is often unable to have sufficient proton-conductivity. Accordingly, the specific surface area is preferably in the range of 10 to 2000 $m^2/g$.

In the oxide carriers B and the oxide particles A supported thereon, the ratio (X/Y) of the elements X and Y contained in the particles A and the carriers B, respectively is preferably in the range of 0.0001 to 5, more preferably in the range of 0.01 to 1. If the element ratio (X/Y) is less than 0.0001, the supported particles A are often in such a small amount that the proton conduction field is insufficiently formed to lower the proton-conductivity. However, if the element ratio (X/Y) is more than 5, the supported particles A are often in such a large amount that the proton conduction field is covered with the particles A containing the element X and, consequently, that the proton-conductivity is impaired.

The proton-conductive inorganic oxide used in the present invention is, for example, prepared by the steps of: loading the precursor of the oxide particles A on the oxide carriers B, and subjecting the obtained material to the heat treatment under oxidative atmosphere such as in air. If the heat treatment is carried out at a temperature below 200° C., it is difficult to convert the precursor into the oxide particles A and hence it is difficult to form sufficient chemical bonds between the oxide particles A and the oxide carriers B. As a result, the resultant oxide is liable to have low proton-conductivity. On the other hand, if the temperature is higher than 1000° C., the particles are often sintered and grow to decrease the specific surface area, so that high proton-conductivity cannot be obtained. Accordingly, the temperature of the heat treatment is preferably in the range of 200 to 1000° C., more preferably in the range of 400 to 800° C. In the case where the temperature is 200° C., it is necessary to perform the heat treatment for a long time because the bonds between the oxide particles A and the oxide carriers B are hard to form even though the precursor can be converted into the oxide particles A. In contrast, in the case where the temperature is nearly 1000° C., the proton-conductive inorganic oxide can be synthesized by the heat treatment for a short time because the bonds are easy to form.

The proton-conductive inorganic oxide preferably has solid super-strong acidity. The degree of proton dissociation can be represented by the acidity, and the acidity of the solid acid can be indicated by Hammett acidity function $H_0$. For example, the Hammett acidity function $H_0$ of sulfuric acid is $-11.93$. The proton-conductive inorganic oxide preferably has solid super-strong acidity represented by a Hammett acidity function of $H_0<-11.93$. If the synthesizing process is optimized, the acidity of the oxide super-strong acid in the present invention can be increased up to $H_0=-20.00$. Accordingly, the oxide super-strong acid preferably has a Hammett acidity function $H_0$ satisfying the condition of: $-20.00<H_0<-11.93$. The acidity of the solid super-strong acid can be estimated by color reactions of indicators. Examples of the usable acid indicators include: m-nitrotoluene (pKa=$-$11.99), p-nitrofluorobenzene (pKa=$-$12.40), p-nitrochlorobenzene (pKa=$-$12.70), m-nitrochlorobenzene (pKa=$-$13.16), 2,4-dinitrotoluene (pKa=$-$13.75), 2,4-dinitrofluorobenzene (pKa=$-$14.52), and 1,3,5-trinitrobenzene (pKa=$-$16.04). The acid indicator changes the color when adsorbed on the surface of the solid super-strong acid. The acidity can be estimated by observing the change of the color. However, it is difficult to estimate the solid acidity of colored oxide super-strong acid such as $SnO_2$ by the color reactions of the indicators. In that case, the solid super-strong acidity can be estimated by the temperature-programmed desorption (TPD) of ammonia. The process of the TPD comprises the steps of: adsorbing ammonia gas on the sample of the solid acid, heating the sample to release the ammonia, measuring and analyzing the amount of the released ammonia and the temperature.

The supported catalyst used in the present invention is then explained below.

The fuel cell anode catalyst according to the present invention contains a supported catalyst comprising electrically conductive carriers and fine catalytic particles supported thereon.

The fine catalytic particles can be freely selected from known fuel cell anode catalysts, and normally contains Pt and Ru as the main catalytic elements. Further, auxiliary catalytic elements can be incorporated so as to enhance the catalytic activity. In many cases, an alloy of Pt and Ru is used because Pt is effective both in oxidation of hydrogen and in dehydrogenation of the organic fuel and because Ru is very effective in prevention of poisoning by CO. It should be noted that the catalytic activity is lowered if the content of Ru is too small The electrically conductive carriers are, for example, carbon black particles. However, there is no particular restriction on the conductive carriers as long as they have enough electric conductivity and stability to serve as the carriers. For example, nano-carbon materials developed in these days, such as carbon nanoparticles, carbon nanofiber and carbon nanocoils, can be employed. Further, electrically conductive ceramic materials are also employable as the carriers.

The process for preparation of the supported catalyst used in the present invention is then explained below.

The fine catalytic particles can be loaded on the electrically conductive carriers by known methods such as the impregnated method, the precipitation method and the colloidal method. However, those methods are often unsuitable for preparation of a metal catalyst oxidizable enough to react with water. In that case, the catalytic particles are generally loaded on the conductive carriers directly by the sputtering method or by the vapor-deposition method. According to those methods, a catalyst having metallic bonds in a particular mixed state is easily obtained. However, there is no particular restriction on the method, and the catalytic particles may be loaded on the electrically conductive carriers by any method.

If the fine catalytic particles are nanoparticles, the highest catalytic activity can be obtained. The mean particle size of the catalytic particles is preferably 10 nm or less. If it is larger than 10 nm, the catalytic activity is liable to deteriorate considerably. The mean particle size is more preferably in the range of 0.5 to 10 nm. If the mean size is smaller than 0.5 nm, it is difficult to control the synthesizing process of the catalyst and hence it costs a lot to synthesize the catalyst. The catalytic particles having a mean size of 10 nm or less (primary particles) can be singly used, but aggregates of them (secondary particles) may be used. Here, the mean particle size is calculated from the half-width of the peak obtained by the XRD measurement.

In the following description, the proton-conductive organic polymer binder used in the present invention is then explained.

The proton-conductive organic polymer binder is preferably an organic polymer having sulfonic acid groups since it has high proton-conductivity. Examples of the proton-conductive polymer include sulfonic acid group-containing fluororesins such as Nafion ([trademark], available from DuPont, FLEMION ([trademark], available from Asahi Glass Co., Ltd.) and Ashiplex ([trademark], available from Asahi Kasei Corporation). However, there is no particular restriction on the organic polymer as long as it has sulfonic acid groups.

A fuel cell anode according to one embodiment of the present invention comprises an electrode catalyst layer. The electrode catalyst layer comprises: the supported catalyst comprises electrically conductive carriers and fine catalytic particles supported on said electrically conductive carriers; the proton-conductive inorganic oxide supporting $SiO_2$ on its surface; and the proton-conductive organic polymer binder. In the present invention, it is necessary that the weight ratio ($W_{SA+SiO2}/W_c$) of the $SiO_2$-containing proton-conductive inorganic oxide (SA+$SiO_2$) and the supported catalyst (C) be in the range of 0.037 to 0.25; that the weight ratio ($W_P/W_{SA+SiO2}$) of the proton-conductive organic polymer binder (P) and the $SiO_2$-containing proton-conductive inorganic oxide (SA+$SiO_2$) be in the range of 3.5 to 12; and that the weight ratio ($W_{SiO2}/W_{SA}$) of the $SiO_2$ and the proton-conductive inorganic oxide (SA) be in the range of 0.1 to 0.5. If the ratio of $W_{SA+SiO2}/W_c$ is smaller than 0.037, the proton-conductivity is lowered to impair the output power. On the other hand, if the $W_{SA+SiO2}/W_c$ is larger than 0.25, the electric conductivity is lowered to impair the output power. If the ratio of $W_P/W_{SA+SiO2}$ is smaller than 3.5, the proton-conductivity is lowered to impair the output power. On the other hand, if the $W_P/W_{SA+SiO2}$ is larger than 12, the electric conductivity is lowered to impair the output power. It has been hitherto unknown that the performance of fuel cell can be remarkably improved by optimizing the weight ratios among the supported catalyst, the proton-conductive inorganic oxide, and the proton-conductive organic polymer binder.

A membrane electrode assembly according to one embodiment of the present invention comprises an anode (fuel electrode), a cathode (oxidant electrode), and a proton-conductive membrane placed between the anode and the cathode. Further, a fuel cell according to one embodiment of the present invention comprises that membrane electrode assembly.

Figure 1:
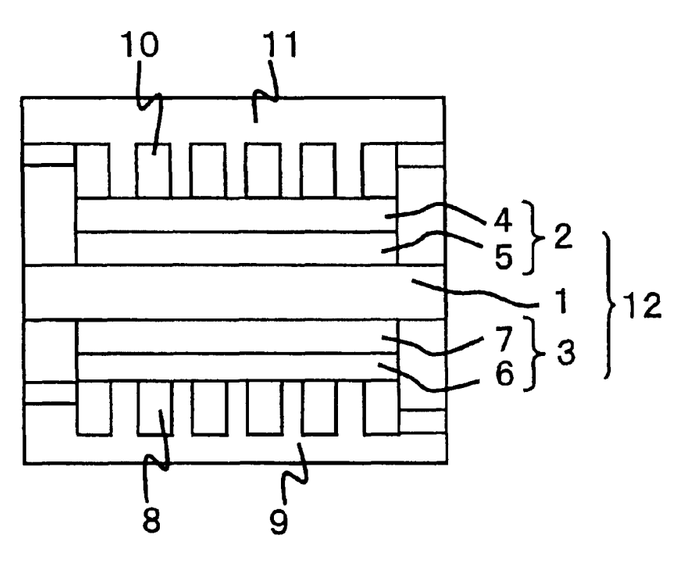
FIG. 1 is a schematic cross-sectional view showing a fuel cell according to one embodiment of the present invention.

FIG. 1 is a schematic cross-sectional view showing a fuel cell according to one embodiment of the present invention.

In FIG. 1, a membrane electrode assembly (hereinafter, often referred to as "MEA") 12 comprises an anode 2, a cathode and a proton-conductive membrane 1. The anode 2 comprises a diffusion layer 4 and an anode catalyst layer 5 provided thereon. The cathode 3 comprises another diffusion layer 6 and a cathode catalyst layer 7 provided thereon. The anode 2 and the cathode 3 are laminated on the opposite sides of the proton-conductive membrane 1 so that the anode catalyst layer 5 and the cathode catalyst layer 7 may face to each other.

The MEA is, for example, placed between a cathode holder 9 equipped with an oxidant gas-supplying path 8 and an anode holder 11 equipped with a fuel-supplying path 10, to form a single cell as shown in FIG. 1.

The anode catalyst layer 5 contains the supported catalyst described above, the proton-conductive inorganic oxide, and the proton-conductive organic polymer binder. The supported catalyst is comprises the fine catalytic particles and the electrically conductive carriers.

The anode catalyst layer 5 contains the supported catalyst, the proton-conductive inorganic oxide, and the proton-conductive organic polymer binder for uniting them together. The contents thereof preferably satisfy the above conditions to ensure optimal proton-conduction. In the case where a concentrated fuel, for example, 100% methanol is used for a long time, the proton-conductive organic polymer binder is often so volume-expanded that the supported catalyst and the proton-conductive inorganic oxide cannot be united enough to keep the catalyst layer. Therefore, a non-proton-conductive binder may be incorporated so as to keep the catalyst layer. However, since the non-proton-conductive binder has neither electric conductivity nor proton conductivity, it is liable to increase the cell resistance or to prevent the reactant from diffusing, and as a result, it often impairs the output power. In view of this, the content of the non-proton-conductive binder is in the range of preferably 0 to 10%, more preferably 0 to 5% per the total weight of the catalyst layer. Examples of the non-proton-conductive binder include polytetrafluoroethylene (PTFE) resin, tetrafluoroethylene-hexafluoropropyrene copolymer (FEP) resin, and tetrafluoroethylene-fluoroalkylvinylether copolymer (PFA) resin.

The cathode catalyst layer 7 contains a cathode catalyst and a proton-conductive binder. As the cathode catalyst, for example, Pt can be used. The catalyst may be loaded on carriers, but does not need to be supported.

The diffusion layers 4 and 6 may be electrically conductive porous sheets, which are made of gas- or liquid-penetrating materials such as carbon cloth or carbon paper.

The anode and the cathode can be produced by known methods. For example, the materials described above are mixed and dispersed in water or an organic solvent such as an alcohol to prepare catalytic slurry, which is then coated on the aforementioned electrically conductive porous sheet, dried and, if needed, fired to form a catalyst layer. The dispersing method is not particularly restricted, and, for example, a dissolver or a ball-mill can be used.

The electrolyte membrane and the electrodes are unified by means of an apparatus capable of heating and/or pressing, normally, by means of a hot-press. In this step, the pressing temperature is higher than the glass transition temperature of hydrophilic polymer adopted as an adhesive between the electrolyte membrane and the electrodes, and is generally in the range of 100 to 400° C. The pressing pressure depends upon the hardness of the electrodes, but is normally in the range of 5 to 200 kg/cm² (19.6 MPa).

A fuel cell according to one embodiment of the present invention comprises the aforementioned MEA, a means for supplying a fuel to the anode, and a means for supplying an oxidant to the cathode. The fuel cell may comprise only one MEA or plural MEAs. The plural MEAs enable the fuel cell to output high electric power. As the fuel, methanol, ethanol, formic acid and an aqueous solution containing at least one of them are employable, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

Example 1

First, a proton-conductive inorganic oxide was synthesized. In 1000 ml of aqueous ammonia, 1.5 g of vanadium oxide $V_2O_5$ was dissolved. Independently, 9 g of titanium oxide $TiO_2$ was dispersed in 500 ml of distilled water. The $V_2O_5$ solution and the $TiO_2$ dispersion liquid were mixed, and 3.0 g of silicon oxide $SiO_2$ was dispersed therein. The obtained mixture was then heated with stirring to 80° C., and was evaporated at a water-vaporizing speed of 100 ml/hour. The residue was dried at 100° C. in an oven for 12 hours to obtain a powder. After pulverized in an agate mortar, the powder was placed in an alumina crucible, heated to 500° C. at an elevation rate of 100° C./hour and left at 500° C. for 4 hours to prepare a mixture of vanadium oxide-supported titanium oxide and vanadium oxide-supported silicon oxide. Successively, the mixture was washed with hot water to obtain another mixture of silicon oxide and vanadium oxide-supported titanium oxide in which the element ratio X/Y between vanadium (X) in the vanadium oxide and titanium (Y) in the titanium oxide was 0.1. The mixture of silicon oxide and vanadium oxide-supported titanium oxide was subjected to X-ray diffraction analysis. As a result, all the observed diffraction peaks were assigned to the titanium oxide, and thereby it was confirmed that the vanadium oxide and the silicon oxide had amorphous structures. The element ratio (X/Y), the solid acidity and the specific surface area of the obtained powdery proton-conductive inorganic material were measured by the inductively coupled plasma-atomic emission spectroscopy (ICP-AES), by the acid indicators or the temperature-programmed desorption (TPD) of ammonia and by the BET method, respectively. The results were as set forth in Table 1.

Thereafter, an anode was produced from the obtained proton-conductive inorganic oxide. A mixture of 2 g of PtRu-supported catalyst, 0.24 g of the proton-conductive inorganic oxide, 7.47 g of 20% Nafion ([trademark], available from DuPont) solution, 3 g of water and 3 g of ethanol was stirred and dispersed well to prepare a slurry. The obtained slurry was coated by means of a control coater onto a carbon paper (350 μm, available from Toray Industries, Inc.) previously subjected to water-repelling treatment, and dried to produce an anode containing the noble metal catalyst in a loading density of mg/cm². The weight ratio ($W_{SA+SiO2}/W_c$) of the $SiO_2$-containing proton-conductive inorganic oxide (SA+$SiO_2$) and the supported catalyst (C), the weight ratio ($W_P/W_{SA+SiO2}$) of the proton-conductive organic polymer binder (P) and the $SiO_2$-containing proton-conductive inorganic oxide (SA+$SiO_2$), and the weight ratio ($W_{SiO2}/W_{SA}$) of the $SiO_2$ and the proton-conductive inorganic oxide (SA) were as set forth in Table 1.

Example 2

The procedure of Example 1 was repeated, except that 1.5 g of vanadium oxide $V_2O_5$ was replaced with 2.4 g of molybdenum oxide $MoO_3$, the amount of silicon oxide $SiO_2$ was changed from 3.0 g to 3.2 g, and the temperature of heating was changed from 500° C. to 600° C., to obtain a mixture of silicon oxide and molybdenum oxide-supported titanium oxide as a proton-conductive inorganic oxide. The element ratio X/Y between molybdenum (X) in the molybdenum oxide and titanium (Y) in the titanium oxide was 0.1. Thereafter, an anode was produced from the obtained proton-conductive inorganic oxide in the same manner as in Example 1.

Example 3

The procedure of Example 1 was repeated, except that 1.5 g of vanadium oxide $V_2O_5$ was replaced with 4.0 g of tungsten oxide $WO_3$, the amount of silicon oxide $SiO_2$ was changed from 3.0 g to 3.5 g, and the temperature of heating was changed from 500° C. to 700° C., to obtain a mixture of silicon oxide and tungsten oxide-supported titanium oxide as a proton-conductive inorganic oxide. The element ratio X/Y between tungsten (X) in the tungsten oxide and titanium (Y) in the titanium oxide was 0.1. Thereafter, an anode was produced from the obtained proton-conductive inorganic oxide in the same manner as in Example 1.

Example 4

The procedure of Example 1 was repeated, except that 9.0 g of titanium oxide $TiO_2$ was replaced with 13 g of zirconium oxide $ZrO_2$, and the amount of silicon oxide $SiO_2$ was changed from 3.0 g to 4.2 g, to obtain a mixture of silicon oxide and vanadium oxide-supported zirconium oxide as a proton-conductive inorganic oxide. The element ratio X/Y between vanadium (X) in the vanadium oxide and zirconium (Y) in the zirconium oxide was 0.1. Thereafter, an anode was produced from the obtained proton-conductive inorganic oxide in the same manner as in Example 1.

Example 5

The procedure of Example 2 was repeated, except that 9.0 g of titanium oxide $TiO_2$ was replaced with 13 g of zirconium oxide $ZrO_2$, and the amount of silicon oxide $SiO_2$ was changed from 3.2 g to 4.2 g, to obtain a mixture of silicon oxide and molybdenum oxide-supported zirconium oxide as a proton-conductive inorganic oxide. The element ratio X/Y between molybdenum (X) in the molybdenum oxide and zirconium (Y) in the zirconium oxide was 0.1. Thereafter, an anode was produced from the obtained proton-conductive inorganic oxide in the same manner as in Example 1.

Example 6

The procedure of Example 3 was repeated, except that 9.0 g of titanium oxide $TiO_2$ was replaced with 13 g of zirconium oxide $ZrO_2$, and the amount of silicon oxide $SiO_2$ was changed from 3.5 g to 4.7 g, to obtain a mixture of silicon oxide and tungsten oxide-supported zirconium oxide as a proton-conductive inorganic oxide. The element ratio X/Y between tungsten (X) in the tungsten oxide and zirconium (Y) in the zirconium oxide was 0.1. Thereafter, an anode was produced from the obtained proton-conductive inorganic oxide in the same manner as in Example 1.

Example 7

The procedure of Example 1 was repeated, except that 9.0 g of titanium oxide $TiO_2$ was replaced with 17 g of tin oxide $SnO_2$, and the amount of silicon oxide $SiO_2$ was changed from 3.0 g to 5.4 g, to obtain a mixture of silicon oxide and vanadium oxide-supported tin oxide as a proton-conductive inorganic oxide. The element ratio X/Y between vanadium (X) in the vanadium oxide and tin (Y) in the tin oxide was 0.1. Thereafter, an anode was produced from the obtained proton-conductive inorganic oxide in the same manner as in Example 1.

Example 8

The procedure of Example 2 was repeated, except that 9.0 g of titanium oxide $TiO_2$ was replaced with 17 g of tin oxide $SnO_2$, and the amount of silicon oxide $SiO_2$ was changed from 3.2 g to 5.6 g, to obtain a mixture of silicon oxide and molybdenum oxide-supported tin oxide as a proton-conductive inorganic oxide. The element ratio X/Y between molybdenum (X) in the molybdenum oxide and tin (Y) in the tin oxide was 0.1. Thereafter, an anode was produced from the obtained proton-conductive inorganic oxide in the same manner as in Example 1.

Example 9

The procedure of Example 3 was repeated, except that 9.0 g of titanium oxide $TiO_2$ was replaced with 17 g of tin oxide $SnO_2$, and the amount of silicon oxide $SiO_2$ was changed from 3.5 g to 5.9 g, to obtain a mixture of silicon oxide and tungsten oxide-supported tin oxide as a proton-conductive inorganic oxide. The element ratio X/Y between tungsten (X) in the tungsten oxide and tin (Y) in the tin oxide was 0.1. Thereafter, an anode was produced from the obtained proton-conductive inorganic oxide in the same manner as in Example 1.

Comparative Example 1

The procedure of Example 1 was repeated, except that the amounts of the proton-conductive inorganic oxide and 20% Nafion ([trademark], available from DuPont) solution were changed from 0.24 g to 0.05 g and from 7.47 g to 1.56 g, respectively, to produce an anode.

Comparative Example 2

The procedure of Example 1 was repeated, except that the amounts of the proton-conductive inorganic oxide and 20% Nafion ([trademark], available from DuPont) solution were changed from 0.24 g to 0.55 g and from 7.47 g to 17.1 g, respectively, to produce an anode.

Comparative Example 3

The procedure of Example 1 was repeated, except that the amount of 20% Nafion ([trademark], available from DuPont) solution was changed from 7.47 g to 3.73 g, to produce an anode.

Comparative Example 4

The procedure of Example 1 was repeated, except that the amount of 20% Nafion ([trademark], available from DuPont) solution was changed from 7.47 g to 16.8 g, to produce an anode.

Comparative Example 5

The procedure of Example 1 was repeated, except that the amount of silicon oxide $SiO_2$ was changed from 3.0 g to 0.1 g, to produce an anode.

Comparative Example 6

The procedure of Example 1 was repeated, except that the amount of silicon oxide $SiO_2$ was changed from 3.0 g to 7.0 g, to produce an anode.

Comparative Example 7

A mixture of 3 g of PtRu-supported catalyst, 8 g of pure water, 15 g of 20% Nafion ([trademark], available from DuPont) solution and 10 g of ethanol was stirred and dispersed well to prepare a slurry. The obtained slurry was coated by means of a control coater onto a carbon paper (350 μm, available from Toray Industries, Inc.) previously subjected to water-repelling treatment, and dried to produce an anode containing the noble metal catalyst in a loading density of 1 mg/cm$^2$.

Each of the anodes obtained above was paired with a standard cathode (comprising Pt catalyst supported on carbon black, available from Tanaka Kikinzoku Kogyo KK). Fuel cell electrodes, membrane electrode assemblies and single cells were produced and evaluated in the following manner.

(Cathode)

A mixture of 2 g of Pt-supported catalyst, 5 g of pure water, 5 g of 20% Nafion ([trademark], available from DuPont) solution and 20 g of 2-ethoxyethanol was stirred and dispersed well to prepare a slurry. The obtained slurry was coated by means of a control coater onto a carbon paper (350 μm, available from Toray Industries, Inc.) previously subjected to water-repelling treatment, and dried to produce a cathode containing the noble metal catalyst in a loading density of 2 mg/cm$^2$.

(Production of Membrane Electrode Assembly)

The anode and the cathode were individually cut into square pieces of 3.2 cm×3.2 cm so that the electrode area might be 10 cm$^2$. A film of Nafion 117 ([trademark], available from DuPont) as the proton-conductive polymer membrane was placed between the anode and the cathode, and hot-pressed at 125° C. and 30 kg/cm$^2$ for 10 minutes to obtain a membrane electrode assembly.

The membrane electrode assembly and delivery plates were combined to assemble a single cell of direct feed solid polymer electrolyte fuel cell. While the single cell was kept at 65° C., air and 1M methanol aqueous solution as a fuel were supplied to the cathode and the anode in amounts of 200 ml/minute and 0.6 ml/minute, respectively, to generate electric power in a current density of 150 mA/cm$^2$ for 30 minutes. Thereafter, the voltage of the cell was measured. The results were as set forth in Table 1.

On the basis of the results shown in Table 1, the comparative MEA (Comparative Example 7), which comprises an anode containing the supported catalyst and the proton-conductive organic polymer binder, was compared with the MEAs according to the present invention (Examples 1 to 9), each of which comprises an anode further containing the proton-conductive inorganic oxide. As a result, it was found that the MEAS of Examples 1 to 9 exhibited higher voltages than the MEA of Comparative Example 7.

Also, Example 1 was compared with Comparative Examples 1 and 2, in which the weight ratio ($W_{SA+SiO2}/W_c$) of the $SiO_2$-containing proton-conductive inorganic oxide (SA+$SiO_2$) and the supported catalyst (C) is out of the range of 0.037 to 0.25. As a result, it was found that Example 1 is superior to Comparative Examples 1 and 2 in the cell voltage. Further, Example 1 was also compared with Comparative Examples 3 and 4, in which the weight ratio ($W_P/W_{SA+SiO2}$) of the proton-conductive organic polymer binder (P) and the $SiO_2$-containing proton-conductive inorganic oxide (SA+$SiO_2$) is out of the range of 3.5 to 12. As a result, it was found that Example 1 is also superior to Comparative Examples 3 and 4 in the cell voltage. Furthermore, Example 1 was still also compared with Comparative Examples 5 and 6, in which the weight ratio ($W_{SiO2}/W_{SA}$) of the $SiO_2$ and the proton-conductive inorganic oxide (SA) is out of the range of 0.1 to 0.5. As a result, it was found that Example 1 is still also superior to Comparative Examples 5 and 6 in the cell voltage.

TABLE 1

| | Proton-conductive inorganic oxide (SA) | | Specific | | | | | |
|---|---|---|---|---|---|---|---|---|
| | Oxide A containing element X | Oxide B containing element Y | surface area (m$^2$/g) | Acidity function H$_0$ | $W_{SA+SiO2}/W_C$ | $W_P/W_{SA+SiO2}$ | $W_{SiO2}/W_{SA}$ | Voltage (V) |
| Ex. 1 | V$_2$O$_5$ | TiO$_2$ | 101 | −12.7 | 0.12 | 6.2 | 0.3 | 0.49 |
| Ex. 2 | MoO$_3$ | TiO$_2$ | 100 | −13 | 0.12 | 6.2 | 0.3 | 0.49 |
| Ex. 3 | WO$_3$ | TiO$_2$ | 99 | −13.16 | 0.12 | 6.2 | 0.3 | 0.5 |
| Ex. 4 | V$_2$O$_5$ | ZrO$_2$ | 100 | −13.75 | 0.12 | 6.2 | 0.3 | 0.5 |
| Ex. 5 | MoO$_3$ | ZrO$_2$ | 101 | −14 | 0.12 | 6.2 | 0.3 | 0.5 |
| Ex. 6 | WO$_3$ | ZrO$_2$ | 102 | −14.5 | 0.12 | 6.2 | 0.3 | 0.51 |

TABLE 1-continued

| | Proton-conductive inorganic oxide (SA) | | Specific surface area (m²/g) | Acidity function $H_0$ | $W_{SA+SiO2}/W_C$ | $W_P/W_{SA+SiO2}$ | $W_{SiO2}/W_{SA}$ | Voltage (V) |
|---|---|---|---|---|---|---|---|---|
| | Oxide A containing element X | Oxide B containing element Y | | | | | | |
| Ex. 7 | $V_2O_5$ | $SnO_2$ | 100 | −15 | 0.12 | 6.2 | 0.3 | 0.51 |
| Ex. 8 | $MoO_3$ | $SnO_2$ | 99 | −15.8 | 0.12 | 6.2 | 0.3 | 0.51 |
| Ex. 9 | $WO_3$ | $SnO_2$ | 100 | −16.04 | 0.12 | 6.2 | 0.3 | 0.52 |
| Com. 1 | $V_2O_5$ | $TiO_2$ | 100 | −12.7 | 0.025 | 6.2 | 0.3 | 0.3 |
| Com. 2 | $V_2O_5$ | $TiO_2$ | 101 | −12.7 | 0.275 | 6.2 | 0.3 | 0.38 |
| Com. 3 | $V_2O_5$ | $TiO_2$ | 101 | −12.7 | 0.12 | 3.1 | 0.3 | 0.39 |
| Com. 4 | $V_2O_5$ | $TiO_2$ | 100 | −12.7 | 0.12 | 14 | 0.3 | 0.4 |
| Com. 5 | $V_2O_5$ | $TiO_2$ | 60 | −12.7 | 0.12 | 6.2 | 0.01 | 0.3 |
| Com. 6 | $V_2O_5$ | $TiO_2$ | 100 | −12.7 | 0.12 | 6.2 | 0.7 | 0.36 |
| Com. 7 | — | — | — | — | — | — | — | 0.43 |

As described above, the present invention can provide a fuel cell capable of giving high output power.

The present invention is by no means restricted by the embodiments described above. It is to be appreciated that those skilled in the art can change or modify the embodiments without departing from the scope and spirit of the present invention. Further, plural components disclosed in the above embodiments can be optionally combined to form various embodiments of the invention. For example, some can be omitted from all the components shown in the embodiments. Further, it is also possible to properly combine the components of different embodiments.

The invention claimed is:

1. A fuel cell anode which comprises an electrode catalyst layer comprising:
    a supported catalyst comprising electrically conductive carriers and fine catalytic particles supported on said electrically conductive carriers,
    a proton-conductive inorganic oxide supporting $SiO_2$ in the form of fine particles on its surface, said proton-conductive inorganic oxide comprising oxide carriers comprising at least one element Y selected from the group consisting of Ti, Zr and Sn, and said proton-conductive inorganic oxide comprising oxide particles comprising at least one element X selected from the group consisting of W, Mo and V, said oxide particles being supported on the oxide carriers and the ratio (X/Y) of the elements X and Y is in the range of 0.0001 to 5, and
    a proton-conductive organic polymer binder;
    wherein
    the weight ratio ($W_{SA+SiO2}/W_c$) of the $SiO_2$-containing proton-conductive inorganic oxide ($SA+SiO_2$) and the supported catalyst (C) is in the range of 0.037 to 0.25,
    the weight ratio ($W_P/W_{SA+SiO2}$) of the proton-conductive organic polymer binder (P) and the $SiO_2$-containing proton-conductive inorganic oxide ($SA+SiO_2$) is in the range of 3.5 to 12, and
    the weight ratio ($W_{SiO2}/W_{SA}$) of the $SiO_2$ and the proton-conductive inorganic oxide (SA) is in the range of 0.1 to 0.5.

2. The fuel cell anode according to claim 1, wherein the proton-conductive inorganic oxide has a Hammett acidity function $H_0$ satisfying the condition of:
    $-20.00 < H_0 \leq -11.93$.

3. The fuel cell anode according to claim 1, wherein the proton-conductive organic polymer binder contains sulfonic acid groups.

4. The fuel cell anode according to claim 1, wherein the fine catalytic particles contain Pt and Ru.

5. The fuel cell anode according to claim 1, wherein the fine catalytic particles have a mean particle size of 10 nm or less.

6. The fuel cell anode according to claim 1, wherein the $SiO_2$ in the form of an accumulated layer is supported on the surface of the proton-conductive inorganic oxide.

7. The fuel cell anode according to claim 1, wherein the proton-conductive inorganic oxide has a specific surface area of 10 to 2000 m²/g.

8. A membrane electrode assembly comprising an anode, a cathode, and an electrolyte membrane placed between said anode and said cathode;
    wherein
    said anode has a catalyst layer which comprises an electrode catalyst layer comprising
    a supported catalyst comprising electrically conductive carriers and fine catalytic particles supported on said electrically conductive carriers,
    a proton-conductive inorganic oxide supporting $SiO_2$ in the form of fine particles on its surface, said proton-conductive inorganic oxide comprising oxide carriers comprising at least one element Y selected from the group consisting of Ti, Zr and Sn, and
    a proton-conductive organic polymer binder,
    provided that
    the weight ratio ($W_{SA+SiO2}/W_c$) of the $SiO_2$-containing proton-conductive inorganic oxide ($SA+SiO_2$) and the supported catalyst (C) is in the range of 0.037 to 0.25,
    the weight ratio ($W_P/W_{SA+SiO2}$) of the proton-conductive organic polymer binder (P) and the $SiO_2$-containing proton-conductive inorganic oxide ($SA+SiO_2$) is in the range of 3.5 to 12, and
    the weight ratio ($W_{SiO2}/W_{SA}$) of the $SiO_2$ and the proton-conductive inorganic oxide (SA) is in the range of 0.1 to 0.5.

9. A fuel cell comprising an anode, a cathode, and an electrolyte membrane placed between said anode and said cathode;
    wherein
    said anode has a catalyst layer which comprises an electrode catalyst layer comprising
    a supported catalyst comprises electrically conductive carriers and fine catalytic particles supported on said electrically conductive carriers,
    a proton-conductive inorganic oxide supporting $SiO_2$ in the form of fine particles on its surface, said proton-conductive inorganic oxide comprising oxide carriers comprising at least one element Y selected from the group consisting of Ti, Zr and Sn, and said proton-conductive inorganic oxide comprising oxide particles comprising at least one element X selected from the group consisting of W, Mo and V, said oxide particles being supported on the oxide carriers and the ratio (X/Y) of the elements X and Y is in the range of 0.0001 to 5, and a proton-conductive organic polymer binder, provided that the weight ratio ($W_{SA+SiO2}/W_c$) of the $SiO_2$-containing proton-conductive inorganic oxide ($SA+SiO_2$) and the supported catalyst (C) is in the range of 0.037 to 0.25, the weight ratio ($W_P/W_{SA+SiO2}$) of the proton-conductive organic polymer binder (P) and the $SiO_2$-containing proton-conductive inorganic oxide ($SA+SiO_2$) is in the range of 3.5 to 12, and the weight ratio ($W_{SiO2}/W_{SA}$) of the $SiO_2$ and the proton-conductive inorganic oxide (SA) is in the range of 0.1 to 0.5.

* * * * *